(12) United States Patent
Chang

(10) Patent No.: US 10,996,525 B2
(45) Date of Patent: May 4, 2021

(54) DISPLAY SUBSTRATE INCLUDING SIGNAL TRANSMISSION WIRING AND METHOD OF FABRICATING THE DISPLAY SUBSTRATE

(71) Applicant: Samsung Display Co., Ltd., Yongin-Si (KR)

(72) Inventor: Jong Woong Chang, Asan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/367,059

(22) Filed: Mar. 27, 2019

(65) Prior Publication Data
US 2019/0219852 A1 Jul. 18, 2019

Related U.S. Application Data

(62) Division of application No. 13/218,320, filed on Aug. 25, 2011, now Pat. No. 10,268,090.

(30) Foreign Application Priority Data

Oct. 20, 2010 (KR) ......................... 10-2010-0102431

(51) Int. Cl.
| | |
|---|---|
| *G02F 1/1345* | (2006.01) |
| *G02F 1/1339* | (2006.01) |
| *G02F 1/161* | (2006.01) |
| *G02F 1/1362* | (2006.01) |
| *G02F 1/1333* | (2006.01) |

(52) U.S. Cl.
CPC .......... *G02F 1/1345* (2013.01); *G02F 1/1339* (2013.01); *G02F 1/161* (2013.01); *G02F 1/136286* (2013.01); *G02F 2001/133388* (2013.01)

(58) Field of Classification Search
CPC combination set(s) only.
See application file for complete search history.

(56) References Cited

U.S. PATENT DOCUMENTS

| | | |
|---|---|---|
| 5,739,880 A | 4/1998 | Suzuki et al. |
| 7,796,227 B2 | 9/2010 | Park |

(Continued)

FOREIGN PATENT DOCUMENTS

| | | |
|---|---|---|
| JP | 2004-064047 A | 2/2004 |
| KR | 10-1999-0054284 A | 7/1999 |

(Continued)

*Primary Examiner* — Lauren Nguyen
(74) *Attorney, Agent, or Firm* — Innovation Counsel LLP

(57) ABSTRACT

Provided are a display substrate and a method of fabricating the same. The display substrate includes: a substrate including a display area and a first non-display area and a second non-display area which are located around the display area; first signal transmission portions located in the first non-display area; second signal transmission portions located in the second non-display area; and a seal line including a first seal line pattern disposed on the first signal transmission portions and a second seal line pattern disposed on the second signal transmission portions, wherein each of the first signal transmission portions includes a gate wiring and a step compensation portion which is disposed on the gate wiring and under the first seal line pattern, and the first seal line pattern overlaps the step compensation portion.

12 Claims, 11 Drawing Sheets

(56) References Cited

U.S. PATENT DOCUMENTS

| | | | |
|---|---|---|---|
| 2005/0140836 A1* | 6/2005 | Choi | G02F 1/136204 349/40 |
| 2006/0139554 A1* | 6/2006 | Park | G02F 1/1341 349/152 |
| 2007/0182909 A1* | 8/2007 | Kim | G02F 1/1362 349/149 |
| 2009/0290085 A1 | 11/2009 | Chang et al. | |
| 2010/0045912 A1 | 2/2010 | Chen et al. | |
| 2010/0045920 A1 | 2/2010 | Kwak et al. | |

FOREIGN PATENT DOCUMENTS

| | | |
|---|---|---|
| KR | 10-2005-0066710 A | 6/2005 |
| KR | 10-2005-0066712 A | 6/2005 |
| KR | 10-2006-0072790 A | 6/2006 |
| KR | 10-2008-0059798 A | 7/2008 |
| KR | 10-1035915 | 5/2011 |
| KR | 10-1085137 | 11/2011 |
| KR | 2003-0080372 | 10/2013 |

* cited by examiner

DISPLAY SUBSTRATE INCLUDING SIGNAL TRANSMISSION WIRING AND METHOD OF FABRICATING THE DISPLAY SUBSTRATE

This application is a divisional application of U.S. patent application Ser. No. 13/218,320 filed Aug. 25, 2011, which claims priority to and the benefit of Korean Patent Application No. 10-2010-0102431 filed on Oct. 20, 2010, in the Korean Intellectual Property Office, the disclosure of which is incorporated herein in its entirety by reference.

BACKGROUND

1. Field of the Invention

The subject matter disclosed herein relates to a display substrate and a method of fabricating the same.

2. Description of the Related Art

Liquid crystal displays (LCDs) are one of the most widely used types of flat panel displays (FPDs). Generally, an LCD includes two substrates having electrodes and a liquid crystal layer interposed between the substrates. In an LCD, voltages are applied to electrodes to arrange liquid crystal molecules of a liquid crystal layer, thereby controlling the amount of light that passes through the liquid crystal layer. As a result, an image is displayed on the LCD.

An LCD typically includes a display substrate having a plurality of pixels defined by gate lines and data lines that intersect each other, a substrate facing the display substrate with liquid crystals interposed therebetween, and driver ICs coupled to the display substrate so as to drive the LCD.

SUMMARY

A step compensation portion compensates for a step difference between the first seal line pattern of the first non-display area and the second seal line pattern of the second non-display area that surrounds a display area of a display device and bonds a display substrate to a common voltage substrate. Thus, the step difference between the first seal line pattern of the first non-display area and the second seal line pattern of the second non-display area is substantially zero. Accordingly, a uniform cell gap can be formed between a first display substrate and a common voltage substrate.

BRIEF DESCRIPTION OF THE DRAWINGS

The above and other aspects and features will become more apparent by describing in detail exemplary embodiments thereof with reference to the attached drawings, in which.

DETAILED DESCRIPTION

Figure 1:
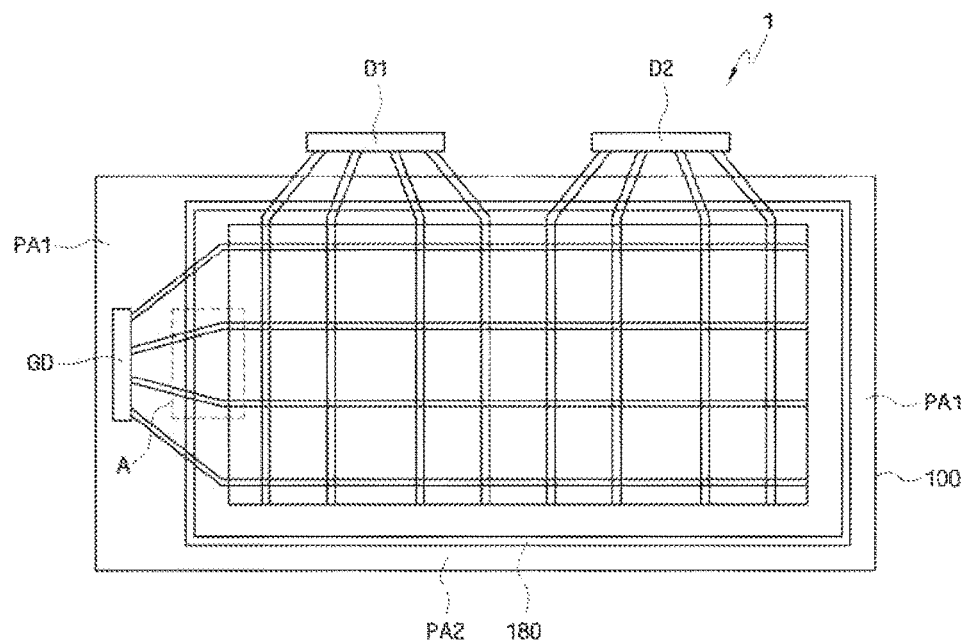
FIG. 1 is a plan view of a display substrate according to a first exemplary embodiment.

Advantages and features of the subject matter claimed herein and methods of accomplishing the same may be understood more readily by reference to the following detailed description of exemplary embodiments and the accompanying drawings. The subject matter claimed may, however, be embodied in many different forms and should not be construed as being limited to the embodiments set forth herein. Rather, these embodiments are provided so that this disclosure will be thorough and complete and will fully convey the concept of the subject matter claimed to those skilled in the art, and will only be defined by the appended claims. Like reference numerals refer to like elements throughout the specification.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the subject matter are described herein with reference to plan and cross-section illustrations that are schematic illustrations of idealized embodiments of the claimed subject matter. As such, variations from the shapes of the illustrations as a result, for example, of manufacturing techniques and/or tolerances, are to be expected. Thus, the embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the claims.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of a display substrate and a method of fabricating the same will be described with reference to the attached drawings.

Figure 2:
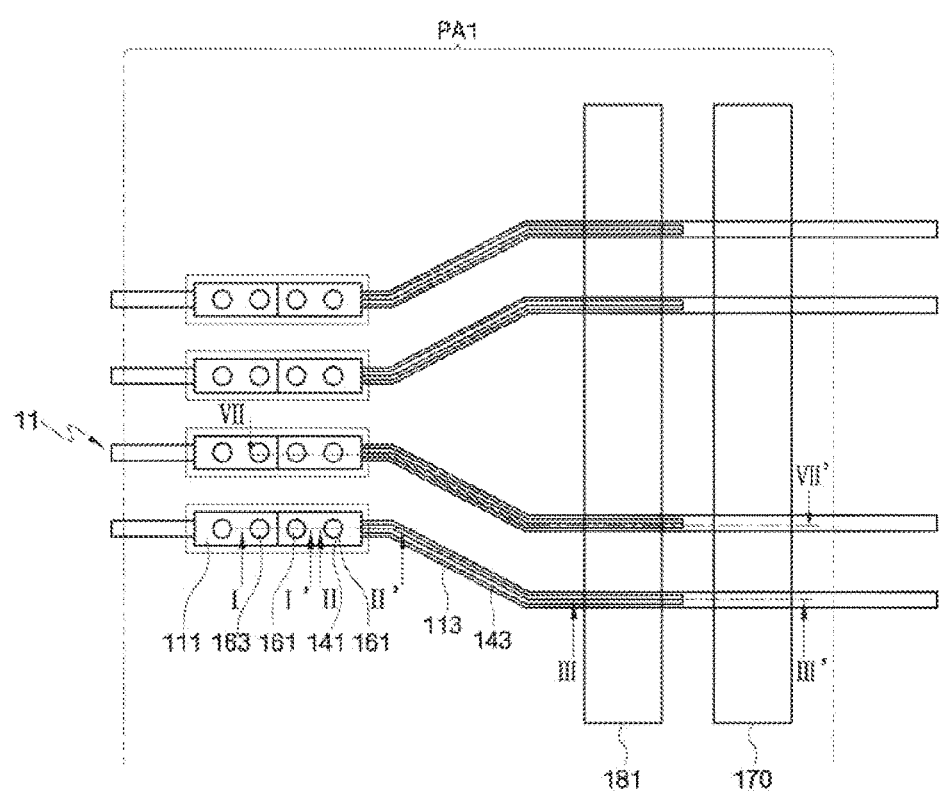
FIG. 2 is an enlarged view of a portion 'A' shown in FIG. 1.
Figure 3:
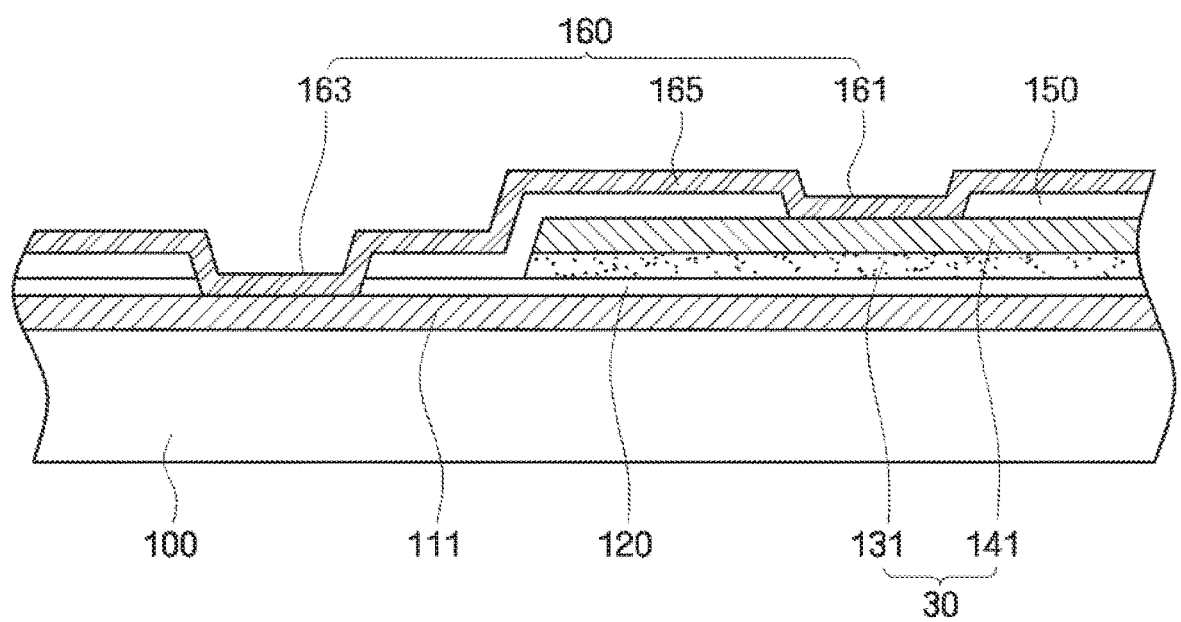
FIG. 3 is a cross-sectional view taken along line I-I' of FIG. 2.
Figure 4:
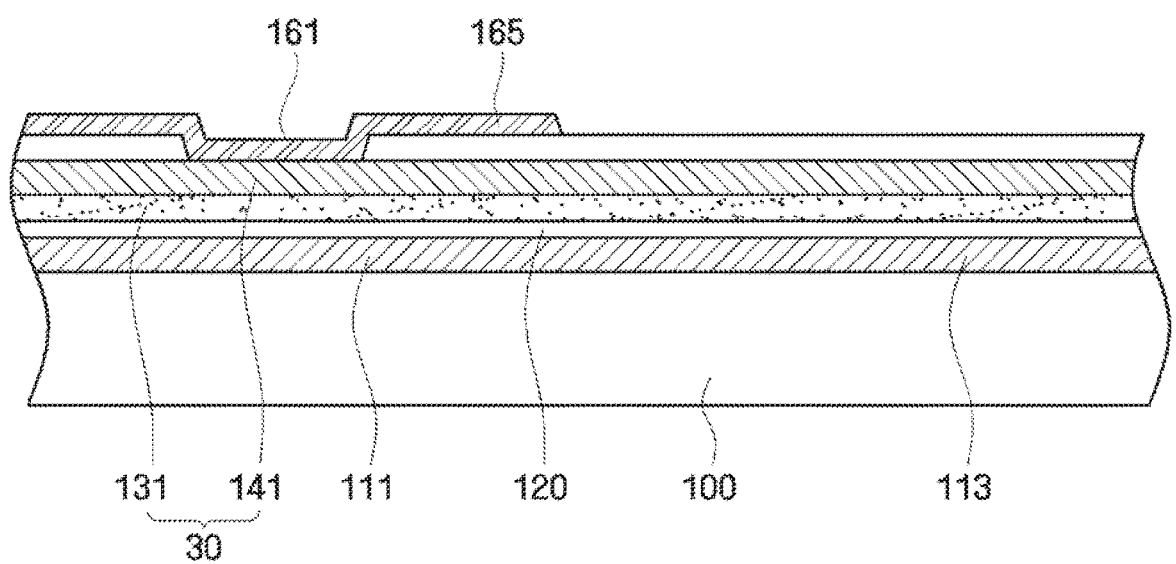
FIG. 4 is a cross-sectional view taken along line II-IF of FIG. 2.
Figure 5:
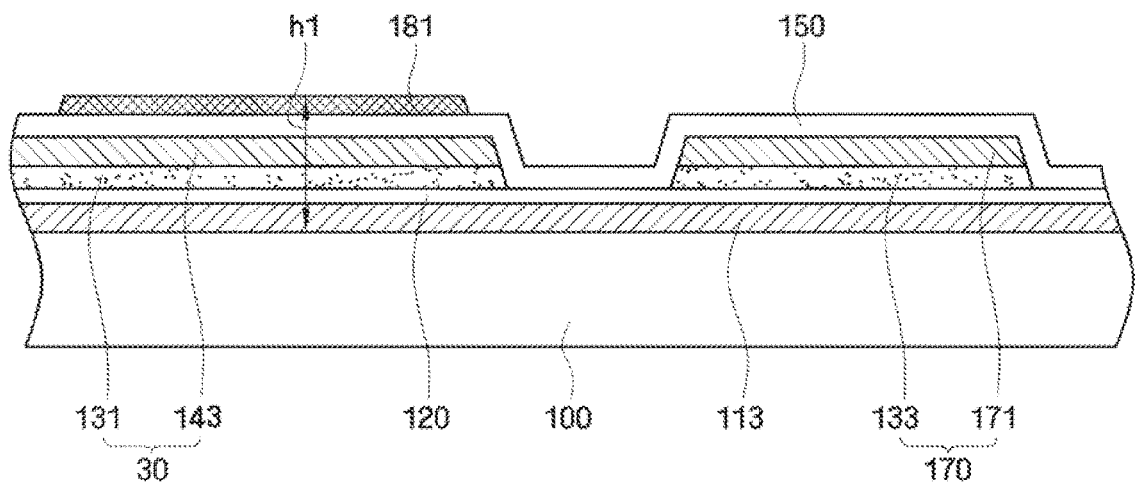
FIG. 5 is a cross-sectional view taken along line III-III' of FIG. 2.
Figure 6:
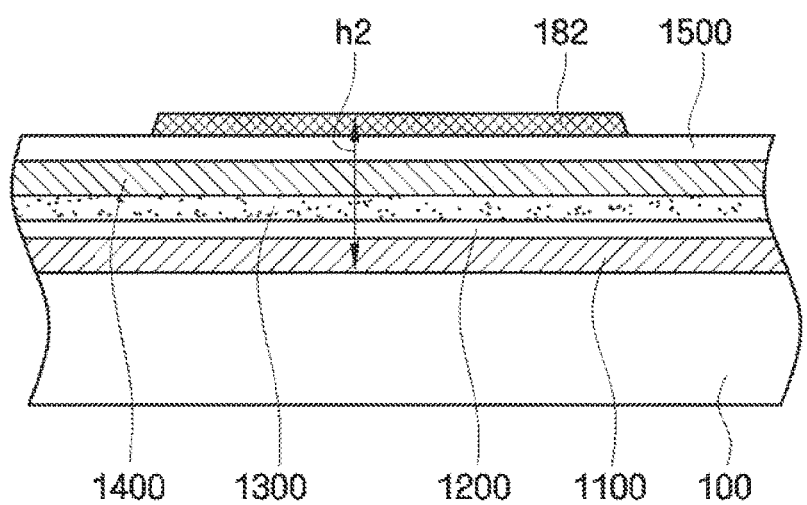
FIG. 6 is a cross-sectional view of a second non-display area.
Figure 7:
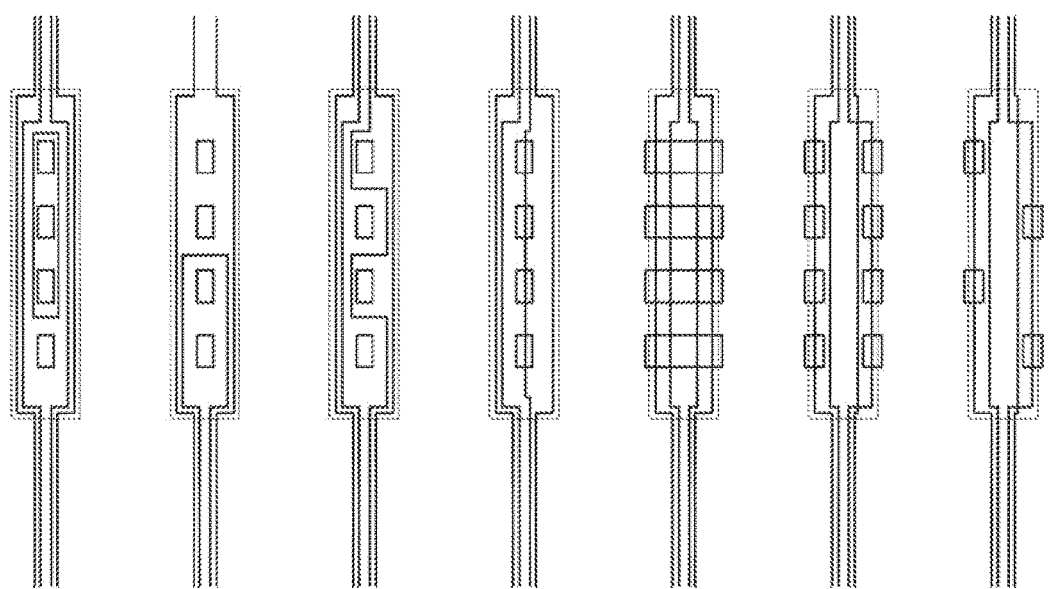
FIG. 7 is a view showing various exemplary embodiments of a bridge connection portion.

A display substrate according to a first exemplary embodiment will now be described with reference to FIGS. 1 through 7. FIG. 1 is a plan view of a display substrate 1 according to a first exemplary embodiment. FIG. 2 is an enlarged view of a portion 'A' shown in FIG. 1. FIG. 3 is a cross-sectional view taken along line I-I' of FIG. 2. FIG. 4 is a cross-sectional view taken along line II-IF of FIG. 2. FIG. 5 is a cross-sectional view taken along line III-III' of FIG. 2. FIG. 6 is a cross-sectional view of a second non-display area PA2. FIG. 7 is a view showing various exemplary embodiments of a bridge connection portion 160.

Referring to FIGS. 1 and 2, the display substrate 1 may include a display area DA and first and second non-display areas PA1 and PA2 located around the display area DA. A plurality of pixels (not shown) which receive electrical signals and display images may be arranged in the display area DA.

A gate driver circuit portion GD and data driver circuit portions D1 and D2 may be located in the first and second non-display areas PA1 and PA2 to deliver electrical signals to the pixels. For example, the gate driver circuit portion GD may be located in the first non-display area PA1, and the data driver circuit portions D1 and D2 may be located in the second non-display area PA2.

First signal transmission portions 11 may be located in the first non-display area PA1 to deliver electrical signals output from the gate driver circuit portion GD to the display area DA. To this end, the gate driver circuit portion GD is electrically connected to the first signal transmission portions 11.

In addition, second signal application portions (not shown) may be located in the second non-display area PA2 to deliver electrical signals output from the data driver circuit portions D1 and D2 to the display area DA. To this end, the data driver circuit portions D1 and D2 are electrically connected to the second signal transmission portions. That is, the second signal transmission portions may be data wirings (not shown) which deliver electrical signals output from the data driver circuit portions D1 and D2 to the display area DA.

A seal line 180 is formed in the first and second non-display areas PA1 and PA2 of the display substrate 100. More specifically, the seal line 180 may be disposed on the first signal transmission portions 11 and the second signal transmission portions in the first and second non-display areas PA1 and PA2. Here, the seal line 180 may include a first seal line pattern 181 and a second seal line pattern 182. The first seal line pattern 181 is disposed on the first signal transmission portions 11, and the second seal line pattern 182 is disposed on the second signal transmission portions.

The seal line 180 bonds the display substrate 100 to a common voltage substrate (not shown) that faces the display substrate 100. Also, the seal line 180 forms a cell gap, into which liquid crystals can be injected, between the display substrate 100 and the common voltage substrate and prevents the leakage of the injected liquid crystals. The seal line 180 may contain, but is not limited to, thermosetting epoxy resin, ultraviolet (UV)-curable acrylic resin, or a mixture of the same.

Referring to FIGS. 2 through 5, each of the first signal transmission portions 11 may include a gate wiring 110 which includes a gate pad portion 111 and a gate line 113.

The gate pad portion 111 is located in the first non-display area PA1 and is a portion of the gate wiring 110 which is relatively wider than the gate line 113. A semiconductor chip including the gate driver circuit portion GD may be mounted on the gate pad portion 111. The gate line 113 extends from the first non-display area PA1 to the display area DA. Thus, an electrical signal generated by the gate driver circuit portion GD may be delivered to the display area DA through the gate line 113.

The gate wiring 110 may be made of aluminum (Al)-based metal such as Al and an Al alloy, silver (Ag)-based metal such as Ag and an Ag alloy, copper (Cu)-based metal such as Cu and a Cu alloy, molybdenum (Mo)-based metal such as Mo and a Mo alloy, manganese (Mn)-based metal such as Mn and Mn alloy, chrome (Cr), titanium (Ti), or tantalum (Ta).

In addition, the gate wiring 110 may have a multi-film structure composed of two conductive films (not shown) with different physical characteristics. One of the two conductive films may be made of metal with low resistivity, such as Al-based metal, Ag-based metal or Cu-based metal, in order to reduce a signal delay or a voltage drop of the gate wiring 110. The other one of the conductive films may be made of a different material, in particular, a material having superior contact characteristics with zinc oxide (ZnO), indium tin oxide (ITO) and indium zinc oxide (IZO), such as Mo-based metal, Cr, Ti, or Ta. Examples of multi-film structures include a chrome lower film and an aluminum upper film, an aluminum lower film and a molybdenum upper film, a copper-manganese (CuMn) alloy lower film and a copper upper film, and a titanium lower film and a copper upper film. However, it is not limited thereto. The gate wiring 110 may be made of various metals and conductors.

Each of the first signal transmission portions 11 may include a gate insulating layer 120. The gate insulating layer 120 is disposed on the gate wiring 110.

The gate insulating layer 120 may be made of, e.g., silicon oxide (SiOx) or silicon nitride (SiNx). Alternatively, the gate insulating layer 120 may have a double-layer structure (not shown) composed of a stack of SiNx and SiOx.

Each of the first signal transmission portions 11 may include a step compensation portion 30 disposed on the gate wiring 110 and the gate insulating layer 120.

The step compensation portion 30 compensates for a step difference between the first seal line pattern 181 of the first non-display area PA1 and the second seal line pattern 182 of the second non-display area PA2. Thus, the step difference between the first seal line pattern 181 of the first non-display area PA1 and the second seal line pattern 182 of the second non-display area PA2 is substantially zero. Accordingly, a uniform cell gap can be formed between the first display substrate 100 and the common voltage substrate. To this end, the first seal line pattern 181 may be disposed on the step compensation portion 30.

The step compensation portion 30 may include a first data wiring pattern 141 which overlaps the gate pad portion 111 and a second data wiring pattern 143 which overlaps the gate line 113. Here, the first data wiring pattern 141 and the second data wiring patter 143 may be located in the display area DA and may be formed on the same layer as a data wiring (not shown) which delivers a data signal to each pixel. Accordingly, like the data wiring, the first data wiring pattern 141 and the second data wiring pattern 143 may have a single-film or multi-film structure composed of a material or materials selected from Ni, Co, Ti, Ag, Cu, Mo, Al, Be, Nb, Au, Fe, Se, Mn, and Ta. Examples of the multi-film structure include a double film, such as Ta/Al, Ta/Al, Ni/Al, Co/Al, Mo (Mo alloy)/Cu, Mo(Mo alloy)/Cu, Ti(Ti alloy)/Cu, TiN(TiN alloy)/Cu, Ta(Ta alloy)/Cu, TiOx/Cu, Al/Nd, Mo/Nb or Mn(Mn alloy)/Cu, and a triple film such as Ti/Al/Ti, Ta/Al/Ta, Ti/Al/TiN, Ta/Al/TaN, Ni/Al/Ni or Co/Al/Co.

The first data wiring pattern 141 overlapping the gate pad portion 111 may be relatively wider than the second data wiring pattern 143 overlapping the gate line 113. Thus, a semiconductor chip including the gate driver circuit portion GD can be mounted on the first data wiring pattern 141. The second data wring pattern 143 may extend from the first data wiring pattern 141 toward the display area DA. In addition, the second data wiring pattern 143 may be electrically connected to the first data wiring pattern 141.

The step compensation portion 30 may include an active layer pattern 131, depending on the number of masks used to fabricate the display substrate 100. The active layer pattern 131 may be disposed under the first data wiring pattern 141 and the second data wiring pattern 143. That is, the active layer pattern 131 may be located between the gate pad portion 111 and the first data wiring pattern 141 and between the gate line 113 and the second data wiring pattern 143.

The active layer pattern 131 is formed on the same layer as an active layer (not shown) which is formed in each pixel of the display area DA. When the display substrate 100 is fabricated by, e.g., a 4-mask process, the active layer pattern 131 may be formed between the gate pad portion 111 and the first data wiring pattern 141 and between the gate line 113 and the second data wiring pattern 143. On the other hand, when the display substrate 1 is fabricated by, e.g., a 5-mask process, the active layer pattern 131 may not be formed between the gate pad portion 111 and the first data wiring pattern 141 and between the gate line 113 and the second data wiring pattern 143.

To prevent the formation of a parasitic capacitor between the first data wiring pattern 141 and the gate pad portion 111 and between the second data wiring pattern 143 and the gate line 113, the first data wiring pattern 141 and the gate pad portion 111 are electrically connected to each other. That is, the step compensation portion 30 and the gate wiring 110 are electrically connected to each other. Thus, the first data wiring pattern 141 and the second data wiring pattern 143 of the step compensation portion 30 can be provided with a gate driving signal and do not float electrically. Since no capacitor is formed between the first and second data wiring patterns 141 and 143 and the gate wiring 110, a gate driving signal can be delivered to the display area DA through the gate wiring 110 without distortion.

Referring to FIGS. 3 and 4, each of the first signal transmission portions 11 may include a bridge connection portion 160 to electrically connect the first data wiring pattern 141 and the gate pad portion 111.

To electrically connect the first data wiring pattern 141 and the gate pad portion 111, the bridge connection portion 160 may include a first contact pattern 163, a second contact pattern 161, and a bridge pad 165. The first contact pattern 163 may be formed on the gate pad portion 111, and the second contact pattern 161 may be formed on the first data wiring pattern 141. Accordingly, the first contact pattern 163 is connected to the gate pad portion 111, and the second contact pattern 161 is connected to the first data wiring pattern 141. The bridge pad 165 which electrically connects the first contact pattern 163 and the second contact pattern 161 is formed on a passivation layer 150. Thus, the first data wring pattern 141 and the gate pad portion 111 are electrically connected to each other by the bridge connection portion 160 which includes the first contact pattern 163, the second contact pattern 161, and the bridge pad 165.

The bridge connection portion 160 may be formed at the same time as a pixel electrode (not shown). Thus, the bridge connection portion 160 may be made of a transparent conductive material that forms the pixel electrode, such as ITO, IZO, or ZnO.

A common voltage application line 170 may be formed on the same layer as the first data wiring pattern 141 and the second data wiring pattern 143. The common voltage application line 170 may be formed of the same material and at the same time as the first data wiring pattern 141 and the second data wiring pattern 143. The common voltage application line 170 applies a common voltage to a common electrode.

Referring to FIG. 5, the first seal line pattern 181 overlaps the gate line 113, the gate insulating layer 120, the step compensation portion 30 which includes the active layer pattern 131 and the second data wiring pattern 143, and the passivation layer 150 disposed thereunder.

Referring to FIG. 6, the second seal line pattern 182 overlaps a gate line 1100, a gate insulating layer 1200, an active layer pattern 1300, a first data driving signal transmission wiring 1400, and a passivation layer 1500 disposed thereunder.

Here, a height h1 from a top surface of a substrate 100 to a top surface of the first seal line pattern 181 is equal to a height h2 from the top surface of the substrate 100 to a top surface of the second seal line pattern 182. Therefore, according to the first exemplary embodiment, the step difference between the first seal line pattern 181 of the first non-display area PA1 and the second seal line pattern 182 of the second non-display area PA2 may be substantially zero. Accordingly, a uniform cell gap can be formed between the display substrate 1 and the common voltage substrate.

Referring to FIG. 7, the first data wiring pattern 141 and the second data wiring pattern 143 of the step compensation portion 30 formed on the gate wiring 110 may have various shapes. In addition, contact holes of various shapes may be formed to electrically connect the gate wiring 110 and the first data wiring pattern 141. The illustrations in FIG. 7 are mere examples, and the shapes of the first and second data wiring patterns 141 and 143 and the contact holes are not limited to thereto.

Figure 8:
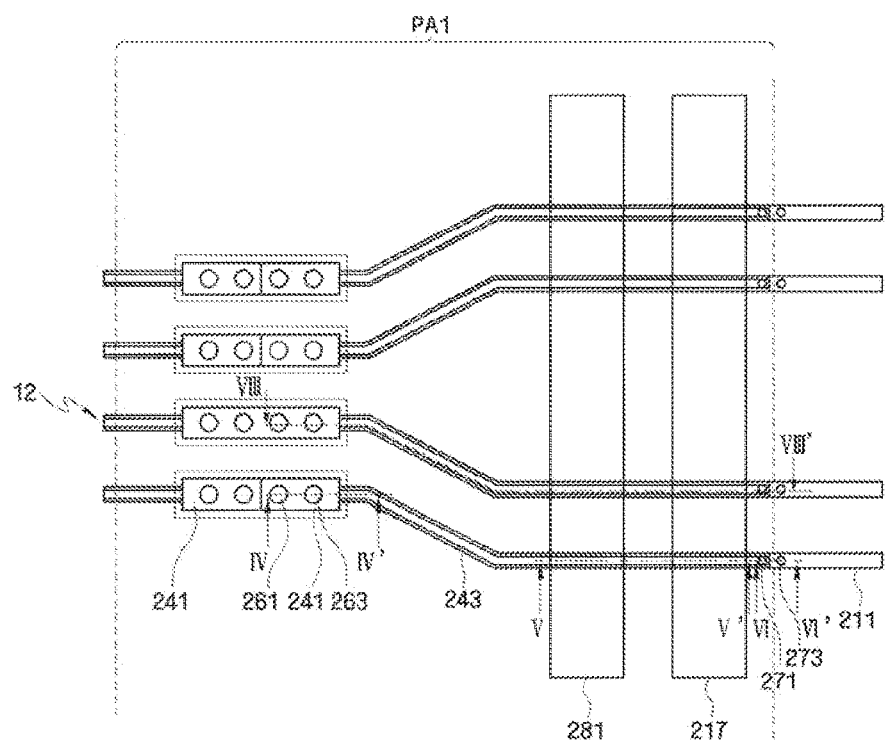
FIG. 8 is an enlarged view of the portion 'A' shown in FIG. 1.
Figure 9:
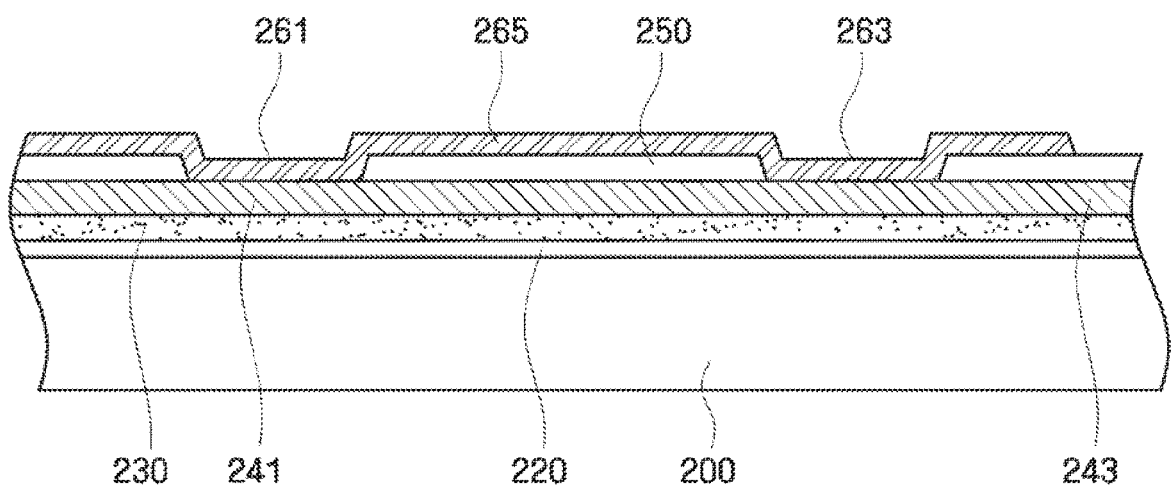
FIG. 9 is a cross-sectional view taken along line IV-IV' of FIG. 8.
Figure 10:
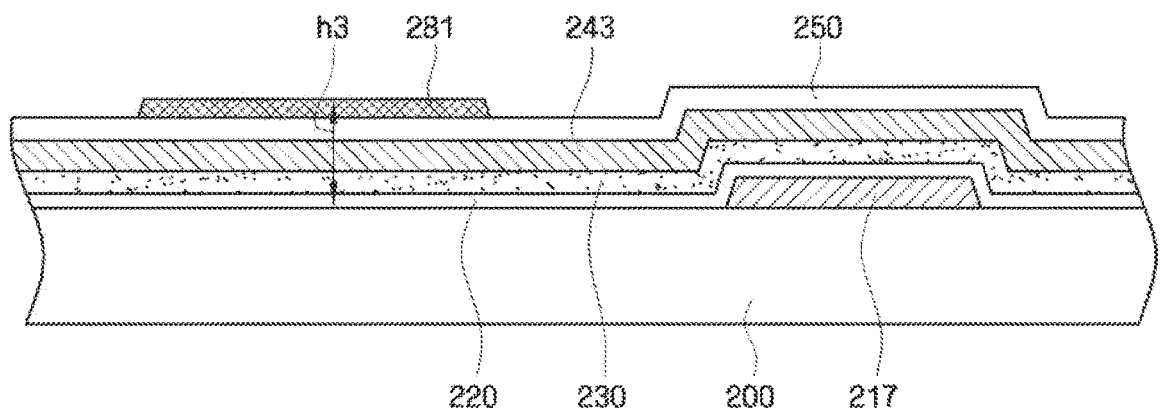
FIG. 10 is a cross-sectional view taken along line V-V' of FIG. 8.
Figure 11:
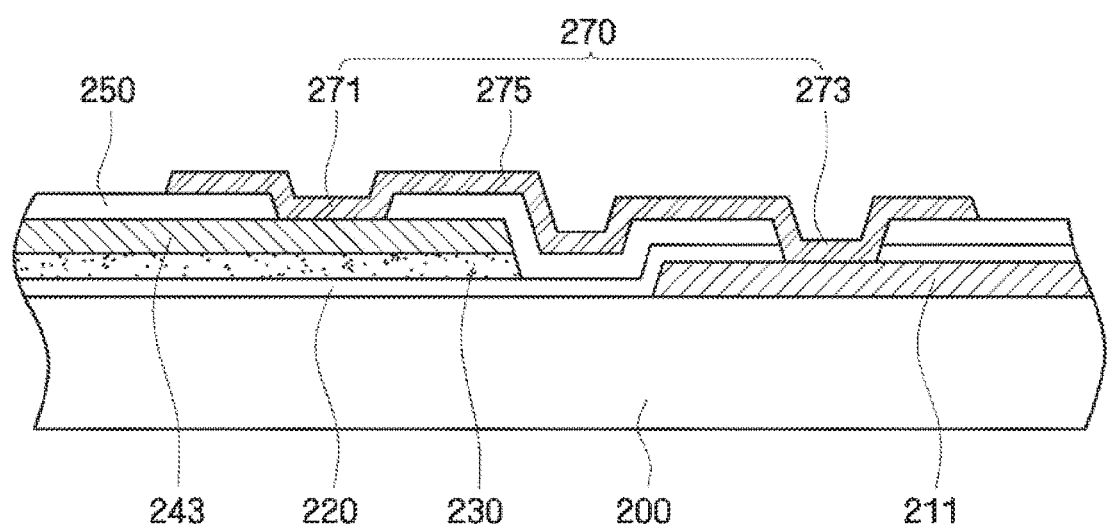
FIG. 11 is a cross-sectional view taken along line VI-VI' of FIG. 8.
Figure 12:
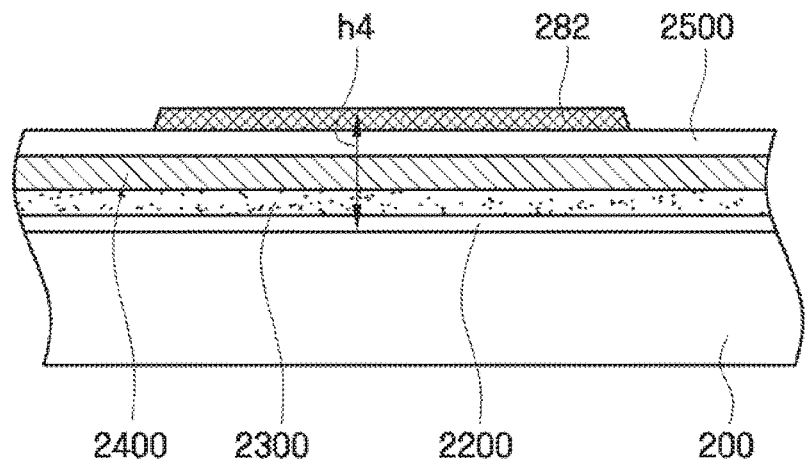
FIG. 12 is a cross-sectional view of a second non-display area.

Hereinafter, a display substrate according to a second exemplary embodiment will be described with reference to FIGS. 8 through 12. FIG. 8 is an enlarged view of the portion 'A' shown in FIG. 1. FIG. 9 is a cross-sectional view taken along line IV-IV' of FIG. 8. FIG. 10 is a cross-sectional view taken along line V-V' of FIG. 8. FIG. 11 is a cross-sectional view taken along line VI-VI' of FIG. 8. FIG. 12 is a cross-sectional view of a second non-display area PA2.

Referring to FIGS. 8 through 11, each of signal transmission portions 12 according to the second exemplary embodiment may include a gate insulating layer 220 disposed on a substrate 200 and a gate driving signal transmission wiring (241 and 243) disposed on the gate insulating layer 220.

The gate insulating layer 220 may be made of, e.g., SiOx or SiNx. Alternatively, the gate insulating layer 220 may have a double-layer structure (not shown) composed of a stack of SiNx and SiOx.

The gate driving signal transmission wiring (241 and 243) may include a pad portion 241 and a line portion 243. The pad portion 241 may be relatively wider than the line portion 243. Accordingly, a semiconductor chip including a gate driver circuit portion GD can be mounted on the pad portion 241. The line portion 243 may extend from the pad portion 241 toward a display area DA.

A semiconductor chip mounting portion may be formed on the pad portion 241. The semiconductor chip mounting portion may include contact conductive portions 261 and 263, which fill contact holes formed in a passivation layer 250, and a conductive pattern 265. The semiconductor chip mounting portion may be made of a transparent conductive material that forms a pixel electrode, such as ITO, IZO, or ZnO.

The gate driving signal transmission wiring (241 and 243) may be located in the display area DA and may be formed on the same layer as a data wiring (not shown) which delivers a data signal to each pixel. Accordingly, like the data wiring, the gate driving signal transmission wiring (241 and 243) may have a single-film or multi-film structure composed of a material or materials selected from Ni, Co, Ti, Ag, Cu, Mo, Al, Be, Nb, Au, Fe, Se, Mn, and Ta. Examples of the multi-film structure include a double film, such as Ta/Al, Ta/Al, Ni/Al, Co/Al, Mo (Mo alloy)/Cu, Mo(Mo alloy)/Cu, Ti(Ti alloy)/Cu, TiN(TiN alloy)/Cu, Ta(Ta alloy)/Cu, TiOx/Cu, Al/Nd, Mo/Nb or Mn(Mn alloy)/Cu, and a triple film such as Ti/Al/Ti, Ta/Al/Ta, Ti/Al/TiN, Ta/Al/TaN, Ni/Al/Ni or Co/Al/Co.

An active layer pattern 230 may be formed under the gate driving signal transmission wiring (241 and 243), depending on the number of masks used to fabricate the display substrate 1. That is, the active layer pattern 230 may be disposed between the gate insulating layer 220 and the gate driving signal transmission wiring (241 and 243).

The active layer pattern 230 is formed on the same layer as an active layer (not shown) formed in each pixel of the display area DA. When the display substrate 200 is formed by, e.g., a 4-mask process, the active layer pattern 230 may be formed between the gate insulating layer 220 and the gate driving signal transmission wiring (241 and 243). On the other hand, when the display substrate 200 is fabricated by, e.g., a 5-mask process, the active layer pattern 230 may not be formed between the gate insulating layer 220 and the gate driving signal transmission wiring (241 and 243).

A gate line 211 which delivers a gate driving signal to each pixel is formed in the display area DA. To deliver a gate driving signal, the gate line 211 is electrically connected to the gate driving signal transmission wiring (241 and 243). More specifically, the gate line 211 is electrically connected to the gate driving signal transmission wiring (241 and 243) by a bridge pattern portion 270.

The bridge pattern portion 270 may include a first contact connection portion 273, a second contact connection portion 271, and a conductive pad 275. The first contact connection portion 273 may be formed on the gate line 211, and the second contact connection portion 271 may be formed on the line portion 243 of the gate driving signal transmission wiring (241 and 243).

Accordingly, the first contact connection portion 273 is connected to the gate line 211, and the second contact connection portion 271 is connected to the line portion 243 of the gate driving signal transmission wiring (241 and 243).

The conductive pad 275 that electrically connects the first contact connection portion 273 and the second contact connection portion 271 is formed on the passivation layer 250.

Accordingly, the line portion 243 of the gate driving signal transmission wiring (241 and 243) and the gate line 211 are electrically connected to each other by the bridge pattern portion 270 which includes the first contact connection portion 273, the second contact connection portion 271, and the conductive pad 275.

The bridge pattern portion 270 may be formed at the same time as a pixel electrode (not shown). Thus, the bridge pattern portion 270 may be made of a transparent conductive material that forms the pixel electrode, such as ITO, IZO, or ZnO.

A common voltage application line 217 may be formed on the same layer as the gate line 211. The common voltage application line 217 may be formed of the same material and at the same time as the gate line 211. The common voltage application line 217 applies a common voltage to a common electrode.

Referring to FIG. 10, a first seal line pattern 281 overlaps the gate insulating layer 220, the active layer pattern 230, the line portion 243 of the gate driving signal transmission wiring (241 and 243), and the passivation layer 250 disposed thereunder.

Referring to FIG. 12, a second seal line pattern 282 overlaps a gate insulating layer 2200, an active layer pattern 2300, a second data driving signal transmission wiring 2400, and a passivation layer 2500 disposed thereunder.

Here, a height h3 from a top surface of the substrate 200 to a top surface of the first seal line pattern 281 is equal to a height h4 from the top surface of the substrate 200 to a top surface of the second seal line pattern 282. Therefore, according to the second exemplary embodiment, the step difference between the first seal line pattern 281 of a first non-display area PA1 and the second seal line pattern 282 of a second non-display area PA2 may be substantially zero. Accordingly, a uniform cell gap can be formed between the display substrate 200 and a common voltage substrate.

Figure 13:
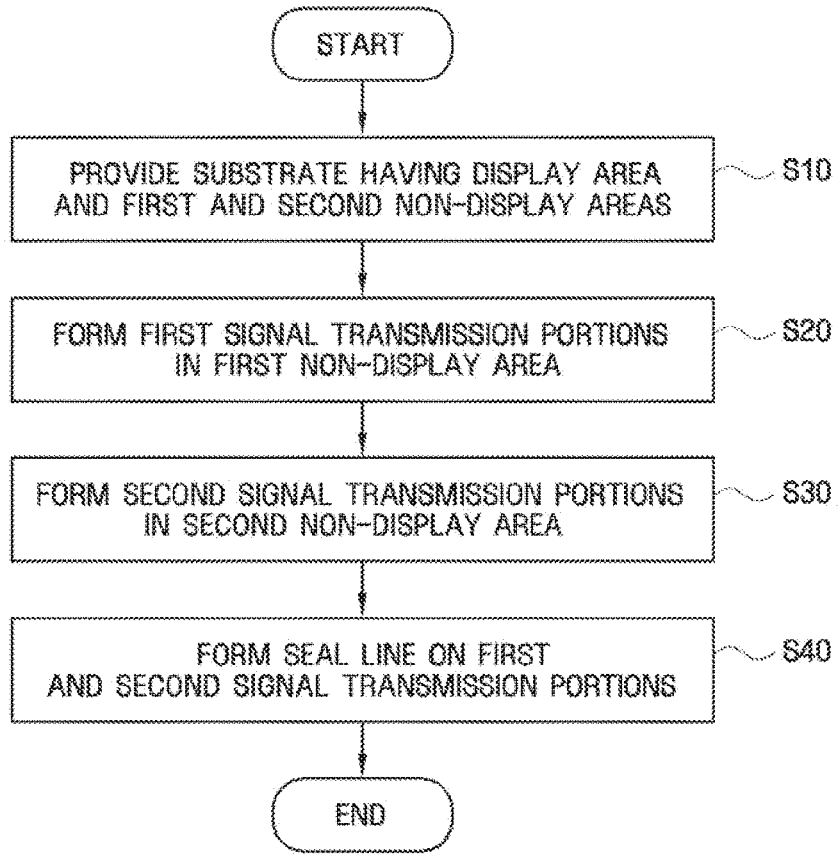
FIG. 13 is a flowchart illustrating a method of fabricating a display substrate according to exemplary embodiments.

Hereinafter, a method of fabricating a display substrate according to a third exemplary embodiment will be described with reference to FIGS. 13 through 17. FIG. 13 is a flowchart illustrating a method of fabricating a display substrate according to exemplary embodiments. FIGS. 14 through 17 are cross-sectional views respectively illustrating intermediate processes in a method of fabricating a display substrate according to a third exemplary embodiment taken along line VII-VII' of FIG. 2. For simplicity, elements having the same functions as those illustrated in the drawings for the first exemplary embodiment are indicated by like reference numerals, and thus their description will be omitted.

Figure 14:
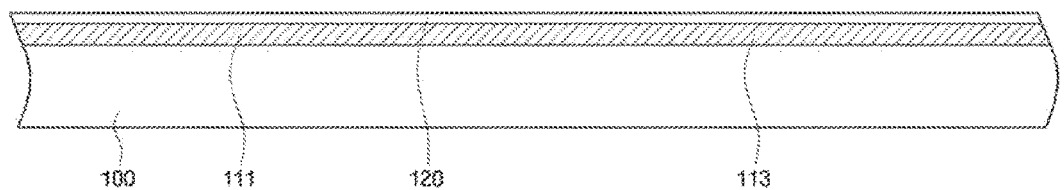
FIGS. 14 through 17 are cross-sectional views respectively illustrating intermediate processes in a method of fabricating a display substrate according to a third exemplary embodiment, taken along line VII-VII' of FIG. 2.

Referring to FIGS. 13 and 14, a substrate 100 having a display area DA and first and second non-display areas PA1 and PA2 is provided.

First signal transmission portions 11 are formed in the first non-display area PA1. To this end, a conductive layer (not shown) is formed of, e.g., Mo-based metal on the substrate 100 by chemical vapor deposition (CVD). Thereafter, the conductive layer is etched, thereby forming a gate wiring 110 which includes a gate pad portion 111 and a gate line 113. Then, a gate insulating layer 120 is formed of, e.g., silicon oxide on the gate wiring 110.

Figure 15:
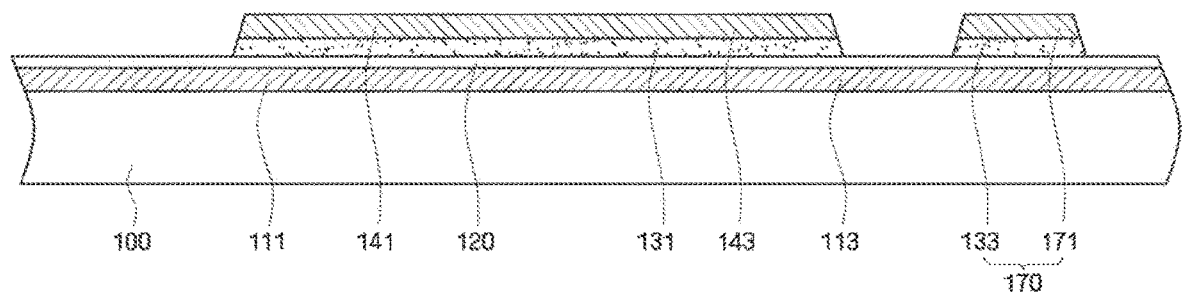

Referring to FIG. 15, a step compensation portion 30 which includes a first data wiring pattern 141 overlapping the gate pad portion 111 and a second data wiring pattern 143 overlapping the gate line 113 is formed on the resultant structure of FIG. 14. If four masks are used, an active layer pattern 131 may be formed under the first data wiring pattern 141 and the second data wiring pattern 143. A common voltage application line 170 including a conductive layer pattern 171 and an active layer pattern 133 may be formed at the same time as the step compensation portion 30.

The first data wiring pattern 141, the second data wiring pattern 143 and the conductive layer pattern 171 may be formed of, e.g., Ta/Al, and the active layer patterns 131 and 133 may be formed of amorphous silicon (a-Si).

Figure 16:
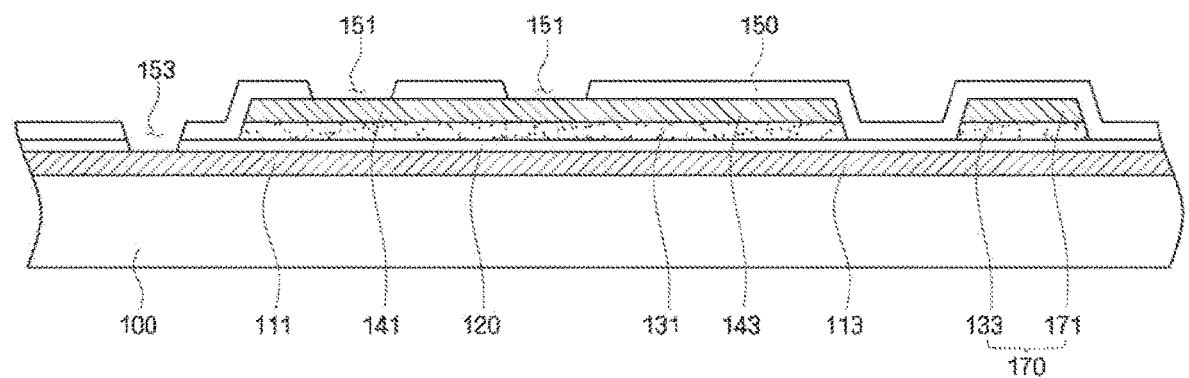

Referring to FIG. 16, a passivation layer 150 is formed of, e.g., silicon oxide on the resultant structure of FIG. 15. Then, contact holes 151 and 153 exposing the gate pad portion 111 and the first data wiring pattern 141 are formed.

Figure 17:
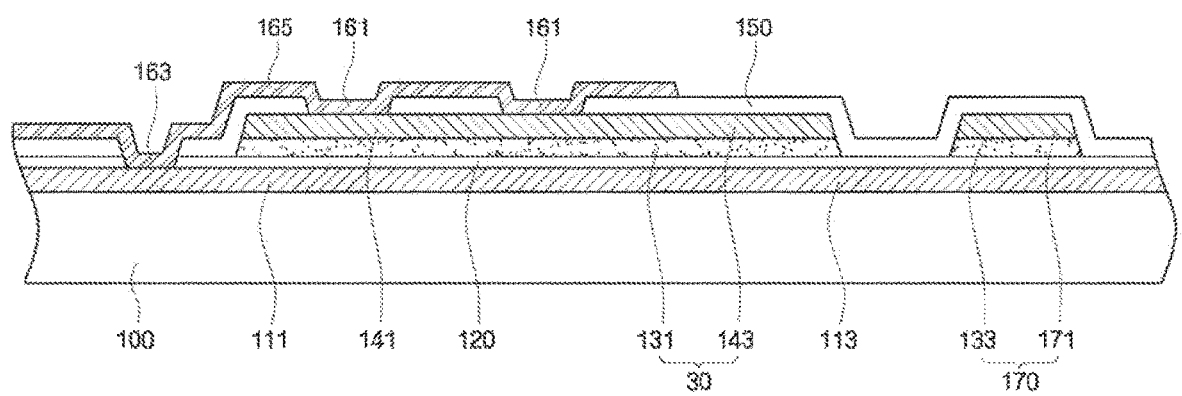

Referring to FIG. 17, a bridge connection portion 160 is formed of, e.g., ITO to electrically connect the first data wiring pattern 141 and the gate pad portion 111. As a result, the first signal transmission portions 11 are formed. Second signal transmission portions (not shown) may be formed in the second non-display area PA2 at the same time as the first signal transmission portions 11.

Next, referring to FIG. 5, a first seal line pattern 181 is formed in the first non-display area PA1 to overlap the gate line 113, the gate insulating layer 120, the step compensation portion 30 which includes the active layer pattern 131 and the second data wiring pattern 143, and the passivation layer 150. At the same time as the first seal line pattern 181, a second seal line pattern 182 is formed in the second non-display area PA2.

Hereinafter, a method of fabricating a display substrate according to a fourth exemplary embodiment will be described with reference to FIGS. 13 and 18 through 21. FIGS. 18 through 21 are cross-sectional views respectively illustrating intermediate processes in a method of fabricating a display substrate according to a fourth exemplary embodiment taken along line VIII-VIII' of FIG. 8. For simplicity, elements having the same functions as those illustrated in the drawings for the second exemplary embodiment are indicated by like reference numerals, and thus their description will be omitted.

Figure 18:
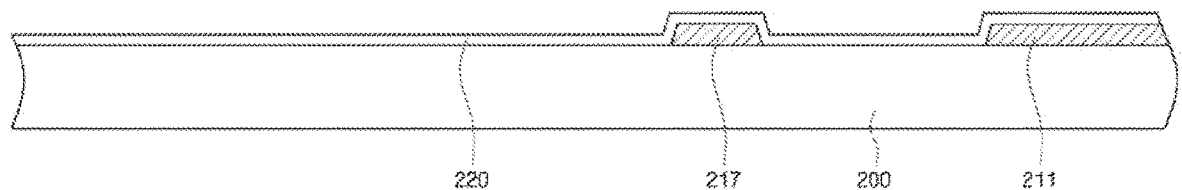
FIGS. 18 through 21 are cross-sectional views respectively illustrating intermediate processes in a method of fabricating a display substrate according to a fourth exemplary embodiment, taken along line VIII-VIII' of FIG. 8.

Referring to FIGS. 13 and 18, a substrate 200 having a display area DA and first and second non-display areas PA1 and PA2 is provided.

First signal transmission portions 12 are formed in the first non-display area PAL To this end, a conductive layer (not shown) is formed of, e.g., Mo-based metal on the substrate 200 by CVD. Thereafter, the conductive layer is etched, thereby forming a gate line 211 in the display area DA and a common voltage application line 217 in the first non-display area PAL Then, a gate insulating layer 220 is formed of, e.g., silicon oxide on the gate line 211 and the common voltage application line 217.

Figure 19:
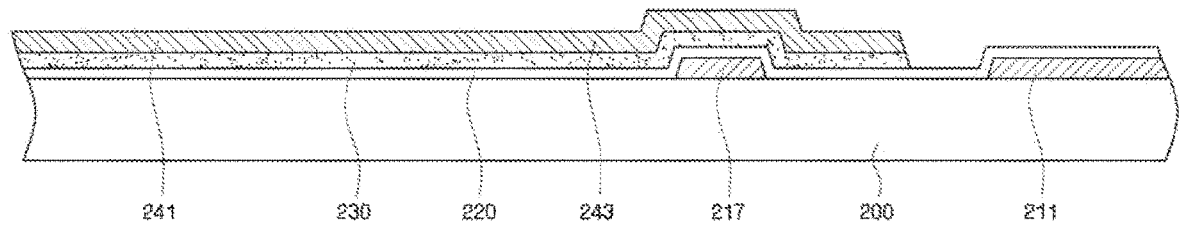

Referring to FIG. 19, a gate driving signal transmission wiring (241 and 243) is formed on the resultant structure of FIG. 18. If four masks are used, an active layer pattern 230 may be formed under the gate driving signal transmission wiring (241 and 243).

Figure 20:
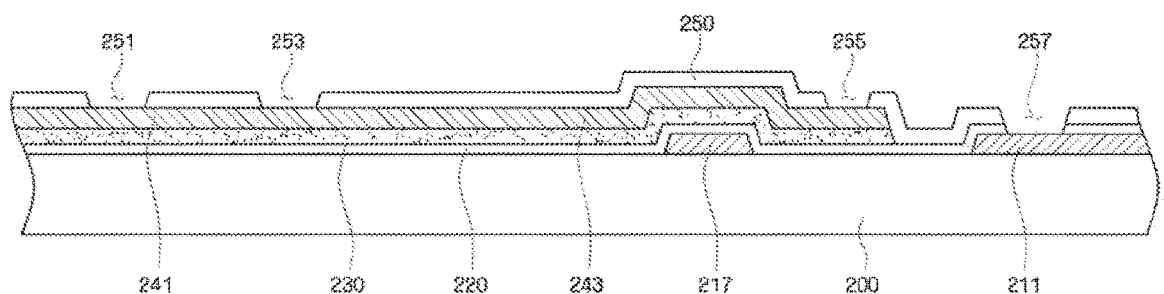

Referring to FIG. 20, a passivation layer 250 is formed of, e.g., silicon oxide on the resultant structure of FIG. 19. Then, contact holes 251, 253, 255 and 257 exposing the gate line 211 and the gate driving signal transmission wiring (241 and 243) are formed.

Figure 21:
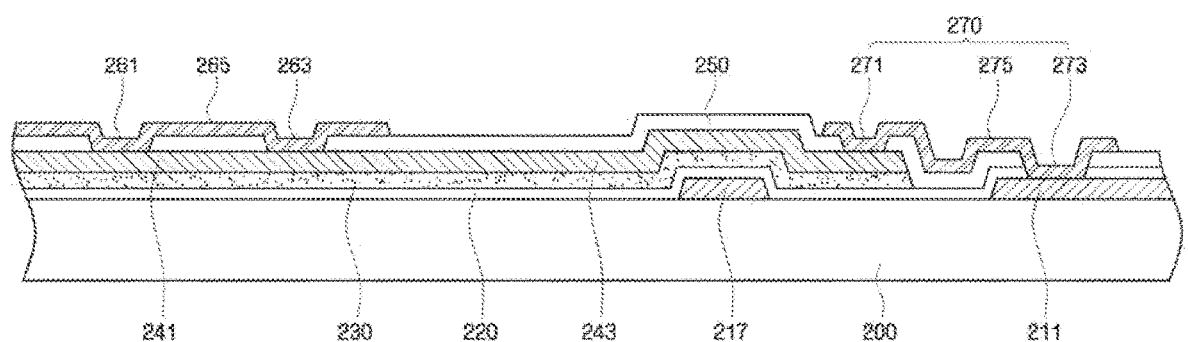

Referring to FIG. 21, a bridge pattern portion 270 is formed of, e.g., ITO to electrically connect the gate line 211 and the gate driving signal transmission wiring (241 and 243). As a result, the first signal transmission portions 12 are formed. Second signal transmission portions (not shown) may be formed in the second non-display area PA2 at the same time as the first signal transmission portions 12.

Next, referring to FIG. 10, a first seal line pattern 281 is formed in the first non-display area PA1 to overlap the gate insulating layer 220, the active layer pattern 230, the gate driving signal transmission wiring (241 and 243), and the passivation layer 250. At the same time as the first seal line pattern 281, a second seal line pattern 282 is formed in the second non-display area PA2.

While the claimed subject matter has been particularly shown and described with reference to exemplary embodiments thereof, it will be understood by those of ordinary skill in the art that various changes in form and detail may be made therein without departing from the spirit and scope of the subject matter as defined by the following claims. The exemplary embodiments should be considered in a descriptive sense only and not for purposes of limitation.

What is claimed is:

1. A display substrate comprising:
a first substrate comprising a display area and a first non-display area and a second non-display area which are located around the display area;
a second substrate opposite the first substrate;
first signal transmission portions located in the first non-display area, wherein each of the first signal transmission portions comprises a gate insulating layer and a gate driving signal transmission wiring disposed on the gate insulating layer;
a conductive pattern connected to the gate driving signal transmission wiring through conductive portions;
second signal transmission portions located in the second non-display area;
gate lines disposed in the display area;
a seal line comprising a first seal line pattern disposed on the first signal transmission portions and a second seal line pattern disposed on the second signal transmission portions; and
a common voltage application line to which a common voltage is applied,
wherein the seal line bonds the first substrate to the second substrate,
wherein the gate driving signal transmission wiring is connected to a gate line of the gate lines through a bridge pattern, and wherein the first seal line pattern overlaps the gate driving signal transmission wiring and is spaced from the corresponding gate line in a plan view of the display substrate, and
wherein the common voltage application line is between the first seal line pattern and the bridge pattern, and the first seal line pattern is between the common voltage application line and the conductive pattern.

2. The display substrate of claim 1, wherein each of the first signal transmission portions further comprises an active layer pattern disposed between the gate insulating layer and the gate driving signal transmission wiring.

3. The display substrate of claim 1, wherein the gate driving signal transmission wiring intersects two opposite edges of the first seal line pattern in the plan view of the display substrate.

4. The display substrate of claim 3, further comprising a bridge pattern portion which comprises a first contact connection portion formed on the gate line, a second contact connection portion formed on the gate driving signal transmission wiring, and a conductive pad electrically connecting the first and second contact connection portions, wherein the gate line and the gate driving signal transmission wiring are electrically connected to each other by the bridge pattern portion.

5. A method of fabricating a display substrate, the method comprising:
   providing a first substrate comprising a display area and a first non-display area and a second non-display area which are located around the display area;
   forming gate lines and a common voltage application line in the display area;
   forming first signal transmission portions in the first non-display area and second signal transmission portions in the second non-display area;
   forming a conductive pattern connected to a gate driving signal transmission wiring of the first signal transmission portions; and
   forming a seal line which comprises a first seal line pattern disposed on the first signal transmission portions and a second seal line pattern disposed on the second signal transmission portions,
   wherein the forming of the seal line comprises bonding the first substrate to a second substrate opposite the first substrate,
   wherein the forming of the first signal transmission portions comprises forming a gate insulating layer and forming a gate driving signal transmission wiring on the gate insulating layer, wherein the gate driving signal transmission wiring is separated from a corresponding gate line among the gate lines by at least the gate insulating layer and is electrically connected to the corresponding gate line, and wherein the first seal line pattern overlaps the gate driving signal transmission wiring and is spaced from the corresponding gate line in a plan view of the display substrate, and
   wherein the common voltage application line is between the first seal line pattern and the bridge pattern, and the first seal line pattern is between the common voltage application line and the conductive pattern.

6. The method of claim 5, wherein the forming of the first signal transmission portions further comprises forming an active layer pattern between the gate insulating layer and the gate driving signal transmission wiring.

7. The method of claim 5, wherein the gate driving signal transmission wiring intersects two opposite edges of the first seal line pattern in the plan view of the display substrate.

8. The method of claim 7, further comprising forming a bridge pattern portion, wherein the forming of the bridge pattern portion comprises forming a first contact connection portion on the gate line, forming a second contact connection portion on the gate driving signal transmission wiring and forming a conductive pad which electrically connects the first and second contact connection portions, and the gate line and the gate driving signal transmission wiring are electrically connected to each other by the bridge pattern portion.

9. The display substrate of claim 1,
   wherein the gate driving signal transmission wiring overlaps the common voltage application line.

10. The display substrate of claim 1, further comprising:
    a contact conductive portion connected to the first signal transmission portions through a contact hole penetrating a passivation on the first signal transmission portions;
    wherein the first seal line pattern is between the contact conductive portion and the common voltage application line.

11. The method of claim 5,
    wherein the gate driving signal transmission wiring overlaps the common voltage application line.

12. The method of claim 5, further comprising forming a contact conductive portion connected to the first signal transmission portions through a contact hole penetrating a passivation on the first signal transmission portions,
    wherein the first seal line pattern is between the contact conductive portion and the common voltage application line.

* * * * *